Sept. 20, 1971     J. L. HENNING ET AL     3,606,511
TACKLE BOX
Filed Aug. 3, 1970     3 Sheets-Sheet 1
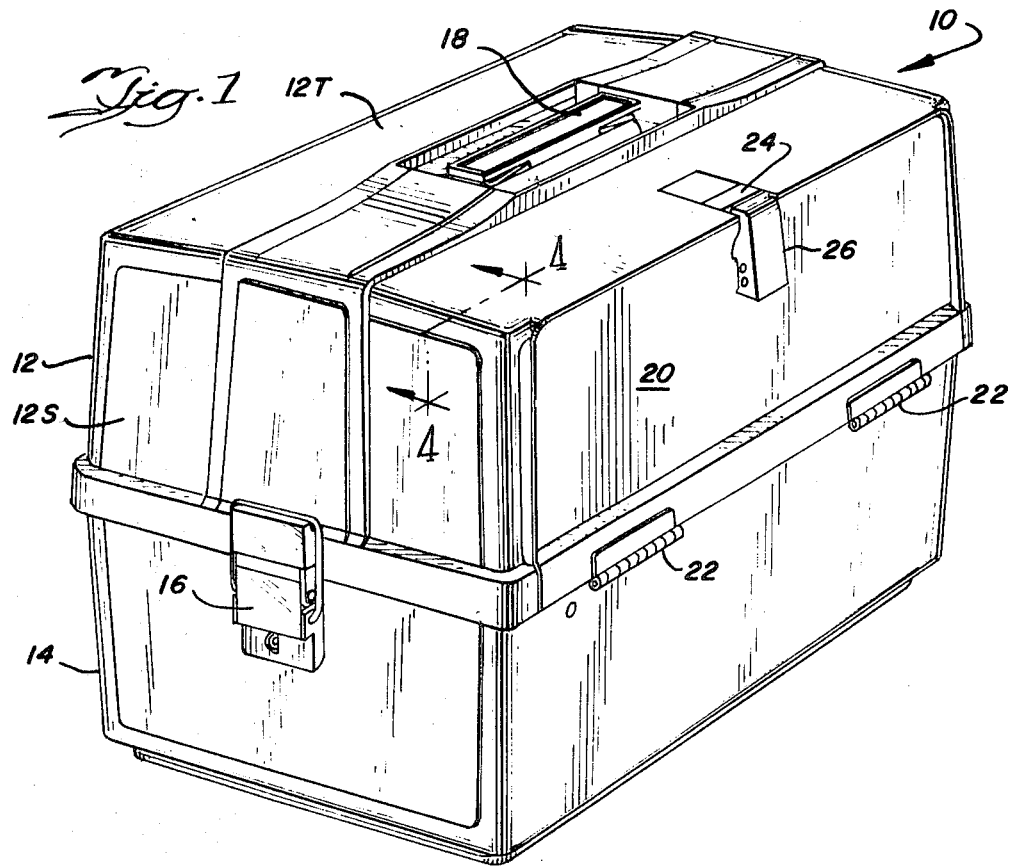
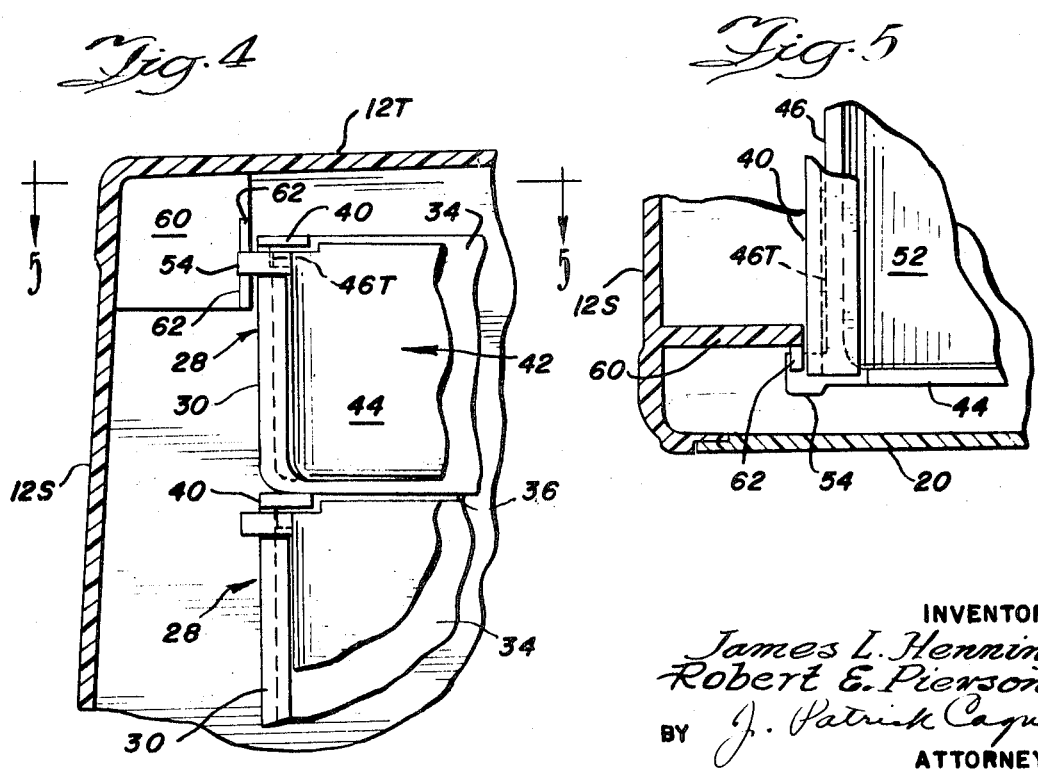
INVENTORS
James L. Henning
Robert E. Pierson
BY J. Patrick Cagney
ATTORNEY

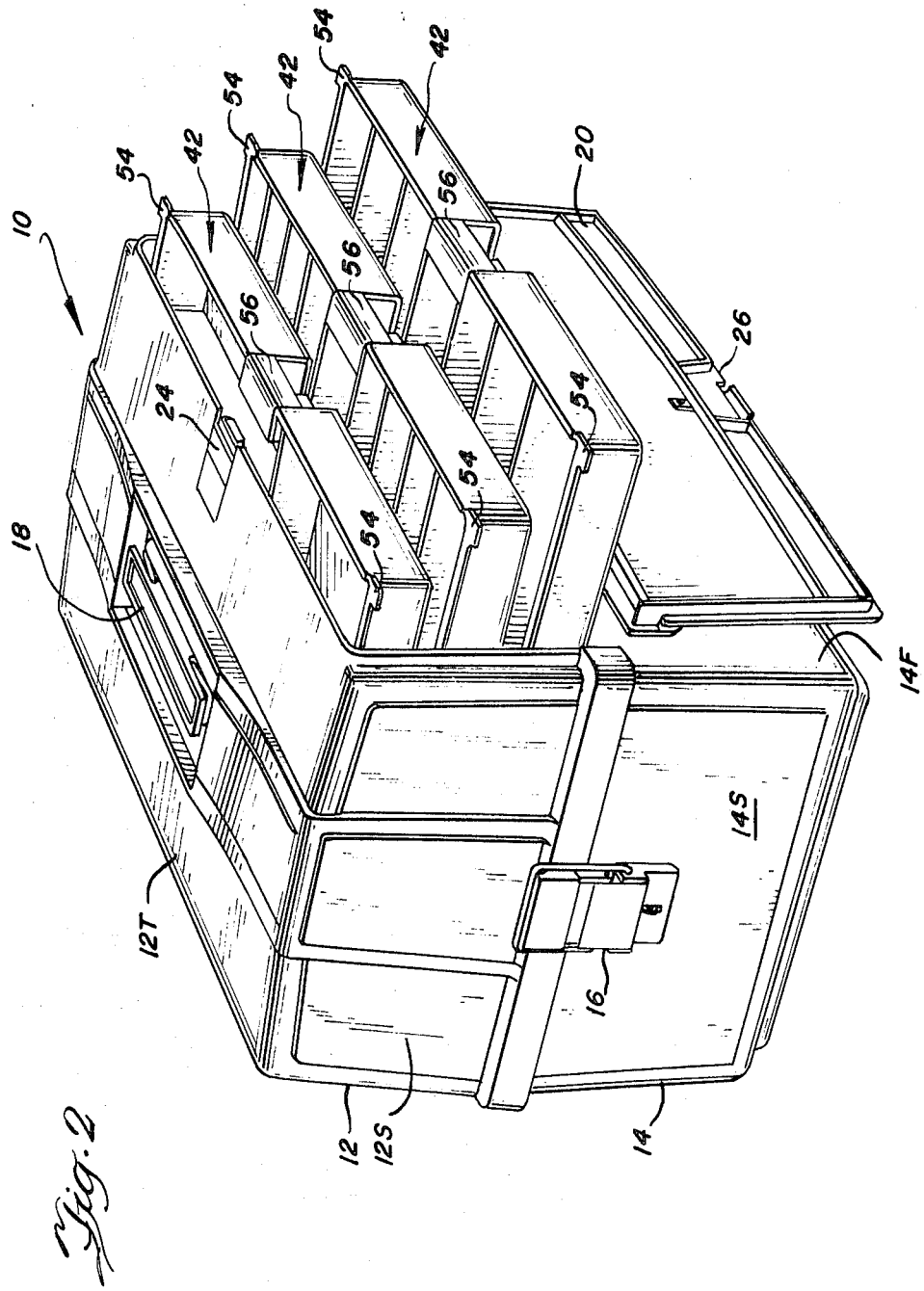

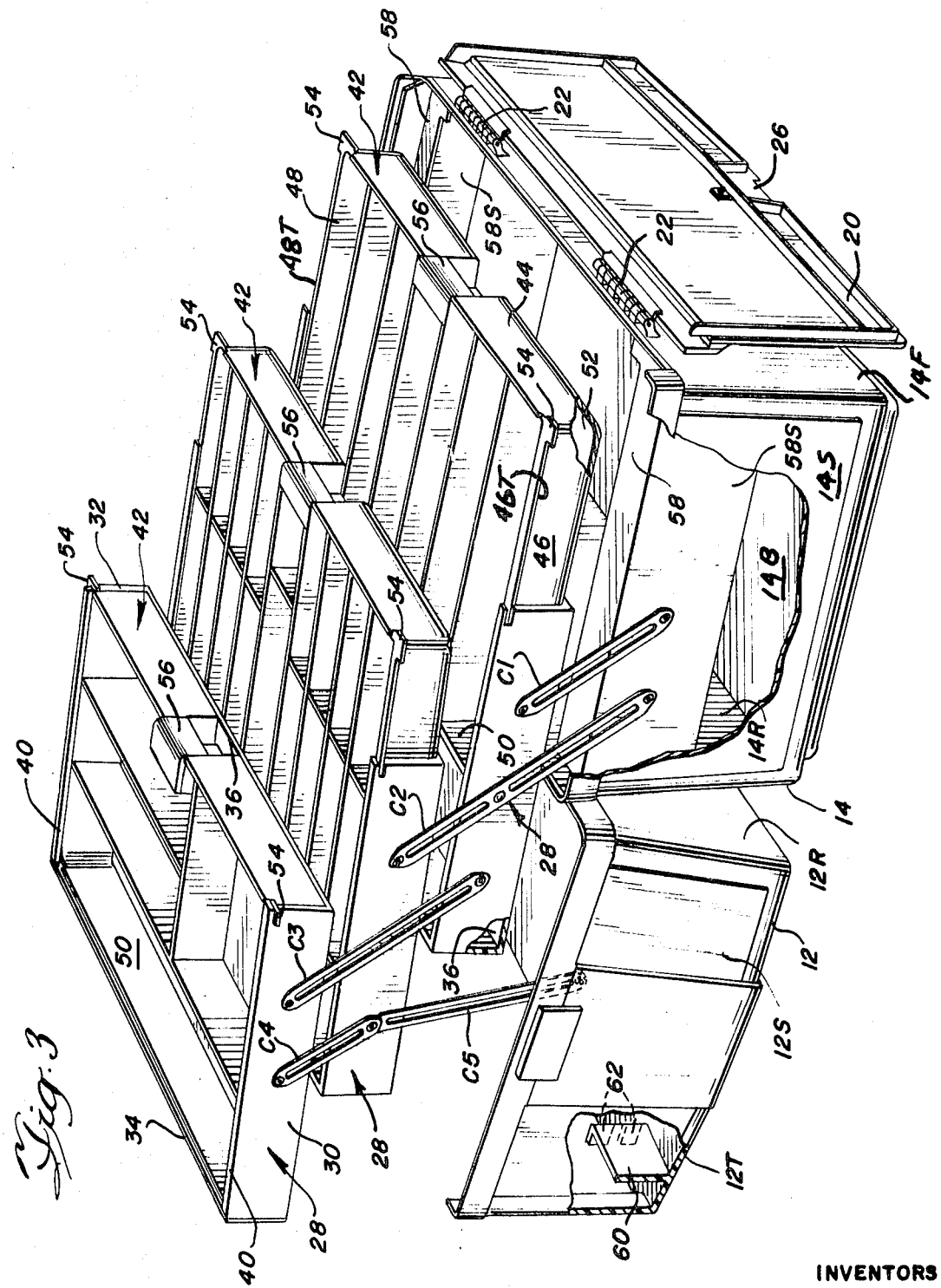

United States Patent Office 3,606,511
Patented Sept. 20, 1971

3,606,511
TACKLE BOX
James L. Henning, Aurora, and Robert E. Pierson, Sugar Grove, Ill., assignors to Plano Molding Company, Plano, Ill.
Filed Aug. 3, 1970, Ser. No. 62,226
Int. Cl. A47b *51/00*
U.S. Cl. 312—266
9 Claims

ABSTRACT OF THE DISCLOSURE

Tackle box includes a plurality of storage drawers guidingly supported for selective horizontal movement by trays which are cantilevered.

BACKGROUND OF THE INVENTION

The present invention relates to fishing tackle boxes.

Although tackle boxes of numerous different constructions are known, there has been expressed a need for a tackle box large enough to accommodate numerous articles of fishing equipment of various sizes and shapes and yet convenient to use in cramped quarters such as are afforded by small boats.

Cantilevered storage compartments, which must be swung open each time access to the contents thereof is required, are commonly incorporated in tackle box constructions. In cramped quarters such boxes, unless quite small, often must be inconveniently shifted around so that they can be fully opened. Moreover, the necessity of frequently cantilevering open an entire array of trays is burdensome to the user.

Tackle boxes have been constructed that incorporate slidable storage drawers. Such boxes require less free space since access to the contents thereof can be had by selectively withdrawing the appropriate drawer. However, such boxes are disadvantageous in that the user cannot have simultaneous accessibility to all of the contents of the box as is possible with boxes having cantilevered compartments. Moreover, frustrations resulting as a consequence of drawers becoming jammed in a closed condition due to an upstanding or otherwise shifted hook, lure or like article reduce the desirability of drawers.

SUMMARY OF THE INVENTION

In accordance with the present invention, a tackle box is provided that includes a plurality of storage drawers guidingly supported for horizontal movement by trays which are cantilevered. This unique arrangement combines the convenience afforded by drawers with the advantage of simultaneous accessibility afforded by cantilevered storage compartments. Moreover, it obviates the problem of jammed drawers since accessibility to the drawers can be had in two ways.

Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawing forming a part of the specification, and in which like numerals are employed to designate like parts throughout the same:

FIG. 1 is a perspective view showing a tackle box in accordance with the present invention and illustrated in a closed condition;

FIG. 2 is a perspective view of the tackle box of FIG. 1 showing the front panel open and the storage drawers partially withdrawn;

FIG. 3 is a perspective view of the tackle box of FIGS. 1 and 2 and showing the cover opened and the drawers cantilevered out;

FIG. 4 is a sectional view taken, as indicated, along the line 4—4 of FIG. 1 and showing of the drawers in the vertically stacked condition and illustrating the safety lock; and FIG. 5 is a sectional view taken as indicated, along the line 5—5 of FIG. 4 and further illustrating the safety lock.

DETAILED DESCRIPTION OF THE PREFERRED EMBODIMENT

Referring now to the drawings, a tackle box 10 constructed in accordance with the present invention is shown to comprise a bottom section 14 and a top cover section 12 mounted for opening and closing the bottom section and jointly therewith defining the box. The bottom section 12 is of generally box-shaped configuration, having a bottom wall 14B, a front wall 14F, a rear wall 14R, and a pair of side walls 14S, and interiorly defining a large bottom storage compartment.

The cover section 12 is of mating box-like configuration, having a top wall 12T, a rear wall 12R, a pair of side walls 12S, and a removable wall portion 20 that defines its front wall. Suitable hinge mechanism (not shown) is provided on the box for pivotally connecting the rear wall 12R of the cover 12 to the rear wall 14R of the bottom section. Hinges 22 connect the removable wall portion 20 of the cover to the front wall 14F of the bottom section and a conventional cam lock assembly 24, 26 is provided for removably securing the removable wall portion 20 in a closed upright condition.

The opposite ends of the box are provided with conventional locks or safety latch assemblies 16 (only one shown) by which the cover 12 can be maintained in a closed position on the bottom section. The cover section 12 is provided with a handle 18 for transporting the tackle box and operating the cover 12 to an open and closed condition.

As illustrated in FIG. 2, a plurality of storage drawers 42 are supported in vertically stacked relation within the box and can be selectively withdrawn after lowering wall portion 20 of the cover 12. As illustrated in FIG. 3, the drawers 42 are supported for guided horizontal movement by a plurality of cantilevered trays 28 so that upon opening of the cover 12, the trays and drawers supported thereby are outwardly cantilevered to a position in vertically stepped relative relation.

The trays are identical and with reference to the uppermost tray include a pair of opposite side walls 30, 32, a back wall 34 and a bottom wall 36 joining the side walls and back wall. As best shown in FIG. 4 the upper portion of the side walls 30, 32 of each tray 28 is inwardly lipped so as to define widthwide extending support surfaces 40 that provide a seat for the tray immediately thereabove when the top cover 12 is closed. When the top cover is closed, the lowest tray 28 receives support and rests upon the top surface channel shaped supports 58 that are fixed adjacent to the side walls 14S of the bottom section 12. Cantilevered movement of the trays is accomplished by pivotally connecting the side walls 30, 32 of the lowest tray 28 through cantilevered arms C1 and C2 to the side walls 58S of supports 58 and by pivotally mounting the upper trays 28 to the lowest tray through cantilevered arms C2, C3 and C4 with the intermediate tray pivotally connected to the cover 12 through a cantilevered arm C5.

The drawers are identical, each having a pair of side walls 46, 48, end walls 44, 50 and a bottom wall 52 joining the side walls and the end walls. Each of the storage drawers 42 is compartmented with a plurality of suitable dividers that define therein selected different sizes of compartments for receiving lures, hooks, shot, etc. To facilitate withdrawal of the drawers 42, each is provided with a finger grip 56 consisting of indentation in the front wall 44 thereof. The drawers are nested within the supporting cantilevered trays with the bottom wall 52 of each drawer resting directly on the bottom wall 36 of the corresponding tray 28. The upper edge of each of the drawer side walls 44, 48 is provided with an outwardly extending tongue 46T, 48T for sliding engagement with the inner surfaces of the side walls of the corresponding tray to provide for firm lateral support of the drawers. Tipping of the drawers is prevented as a consequence of the overlap of the inwardly projecting lips 40 of the tray side walls with the top surface of the drawer side walls.

When the cover 12 is closed upon the bottom storage compartment 14 and the drawers in their vertically stacked condition, it will be noted that the bottom wall 36 of a tray immediately above a drawer serves as a protective top wall for such drawer so that the contents thereof are totally enclosed. As a result, the possibility of a drawer becoming jammed, for example, due to the shifting of a lure is minimized even when the box is subjected to rough treatment. Should a drawer become jammed, the drawer can be easily cleared simply by opening the cover to cantilever the drawers open and repositioning the shifted lure.

To prevent inadvertent opening of the cover 12 (and consequent possible spilling of the contents of the drawers) each drawer is provided with a pair of ears 54 which are received in conforming slots S in the side walls 30, 32 of the trays when the drawers are fully inserted. As best shown in FIGS. 4 and 5 a wall portion 60 extending interiorly from the top wall 12T and side wall 12S of the cover provides a pair of guide arms 62 which are aligned with and receive the ears 54 of the uppermost drawer when the drawer is fully inserted within its tray. This engagement effectively prevents opening of the cover due to the difference in pivot radii of the covers and trays.

It should be noted that as of consequence of the identical configuration of the trays and drawers, as stated above, the drawers can be interchanged at the will of the user.

Although in the preferred form illustrated, each tray supports a single drawer, it will be appreciated that two or more drawers can be supported in side-by-side relation by a single tray by provision of an intermediate upright wall(s) between the two side walls 30, 32 of the tray.

Thus, while preferred constructional features of the invention are embodied in the structure illustrated herein, it is to be understood that changes and variations may be made by those skilled in the art without departing from the spirit and scope of the appended claims.

What is claimed is:

1. A tackle box comprising, a generally box-shaped bottom section open at the top and interiorly defining a bottom storage compartment, a plurality of storage drawers, means for horizontally supporting said drawers in vertically stacked relative relation above said storage compartment, said means including support means individually supporting said drawers for guided horizontal movement, a cover for encasing said drawers and mounted for opening and closing said bottom section, said cover having a removable wall section for permitting selective withdrawal of said drawers when said cover is closed, and means cantilevering said support means for automatically shifting the same upon opening of said cover to a condition in which said drawers are supported thereby in vertically stepped relative relation offset from said storage compartment to provide simultaneous accessibility to said storage compartment and to the interior of said drawers.

2. A tackle box in accordance with claim 1 wherein said support means comprise a plurality of cantilevered trays.

3. A tackle box in accordance with claim 1 wherein said support means comprise a plurality of cantilevered trays, one for each of said drawers, each of said trays having a flat bottom wall and a pair of side walls upstanding therefrom, said drawers being supported in nested relationship between the side walls of said trays.

4. A tackle box in accordance with claim 1 wherein said bottom section includes front and rear walls, said cover being hinge mounted to said rear wall, said removable wall section being hinge mounted to said front wall.

5. A tackle box comprising, a generally box-shaped bottom section open at the top and interiorly defining a bottom storage compartment, a plurality of storage drawers, means for horizontally supporting said drawers in vertically stacked relative relation above said storage compartment, said means including a plurality of support means, one for each drawer, individually supporting said drawers for guided horizontal movement, a cover for encasing said drawers and mounted for opening and closing said bottom section, said cover having a removable wall section for permitting selective withdrawal of said drawers when said cover is closed, and means cantilevering said support means for automatically shifting the same upon opening of said cover to a condition in which said drawers are supported thereby in vertically stepped relative relation offset from said storage compartment to provide simultaneous accessibility to said storage compartment and to the interior of said drawers.

6. A tackle box in accordance with claim 5 wherein each of said support means comprises a tray having a flat bottom wall and a pair of side walls upstanding therefrom, said drawers being supported in nested relationship between the side walls of said trays.

7. A tackle box in accordance with claim 6 wherein said bottom section includes front and rear walls, said cover being hinge mounted to said rear wall, said removable wall section being hinge mounted to said front wall.

8. A tackle box comprising a bottom section, a cover section mounted for opening and closing the bottom section and jointly therewith defining the box, a plurality of cantilevered trays, means cantilevering said trays for automatically moving the same from a vertically stacked condition within the box when the cover is closed to a vertically stepped condition when the cover is opened, and a plurality of storage drawers supported by said trays for guided horizontal movement, said cover including a removable wall portion for permitting selective horizontal withdrawal of said drawers from the box when the cover is closed.

9. A tackle box comprising a bottom section open at the top and interiorly defining a bottom storage compartment, a cover section mounted for opening and closing the bottom section and jointly therewith defining the box, a plurality of cantilevered trays, each of said trays having a flat bottom wall and a pair of side walls upstanding therefrom, means cantilevering said trays for automatically moving the same from a position in which the trays are vertically stacked above one another in substantially complete overlapping relative relation within the box and above said bottom storage compartment when the cover is closed to a position in which the trays are vertically stacked in stepped relative relation horizontally offset from said bottom storage compartment when said cover is opened, and a plurality of storage drawers individually supported for guided horizontal movement between the side walls of said trays, said cover including a removable wall portion for permitting selective horizontal withdrawal of said drawers from the box when the cover is closed.

References Cited

UNITED STATES PATENTS

| | | | |
|---|---|---|---|
| 1,145,264 | 7/1915 | Pfulg | 312—266 |
| 2,870,904 | 1/1959 | Tarbox | 206—12 |
| 3,050,356 | 8/1962 | Messmer | 312—201 |
| 3,301,619 | 1/1967 | Mead | 312—200 |
| 3,367,062 | 2/1968 | Glass | 312—266X |

JAMES T. McCALL, Primary Examiner

U.S. Cl. X.R.

206—16E; 312—272